(12) United States Patent
Katou et al.

(10) Patent No.: US 12,515,285 B2
(45) Date of Patent: Jan. 6, 2026

(54) SCREW FASTENING SYSTEM

(71) Applicant: FANUC CORPORATION, Yamanashi (JP)

(72) Inventors: Yuuki Katou, Yamanashi (JP); Kenji Takahashi, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 374 days.

(21) Appl. No.: 18/044,783

(22) PCT Filed: Dec. 15, 2021

(86) PCT No.: PCT/JP2021/046305
§ 371 (c)(1),
(2) Date: Mar. 10, 2023

(87) PCT Pub. No.: WO2022/138380
PCT Pub. Date: Jun. 30, 2022

(65) Prior Publication Data
US 2024/0024996 A1  Jan. 25, 2024

(30) Foreign Application Priority Data

Dec. 22, 2020  (JP) .................................. 2020-212445

(51) Int. Cl.
*B23P 19/06* (2006.01)
*B25J 13/00* (2006.01)

(52) U.S. Cl.
CPC ............. *B23P 19/066* (2013.01); *B25J 13/00* (2013.01)

(58) Field of Classification Search
CPC ......... B23P 19/066; B23P 19/06; B25J 13/00; B25J 9/1687; B25J 11/00; B25J 9/1633; G05B 2219/40072; G05B 2219/45091; G05B 2219/45203

See application file for complete search history.

(56) References Cited

U.S. PATENT DOCUMENTS

| 4,620,450 A | * | 11/1986 | Yamaguchi | ............. | B25B 23/14 73/761 |
| 2006/0185146 A1 | * | 8/2006 | Piggins | ................. | B23P 19/066 73/862.21 |
| 2014/0166326 A1 | * | 6/2014 | Le Du | ..................... | B25B 21/00 173/181 |

(Continued)

FOREIGN PATENT DOCUMENTS

| JP | H4-310332 A | 11/1992 |
| JP | 2007-50488 A | 3/2007 |

(Continued)

*Primary Examiner* — Sarang Afzali
*Assistant Examiner* — Darrell C Ford
(74) *Attorney, Agent, or Firm* — HAUPTMAN HAM, LLP

(57) ABSTRACT

A screw fastening system includes: an electric motor; a holding device for holding the electric motor; a support member mounted to a drive shaft of the electric motor; a screw fastening machine supported by the support member, and capable of executing a screw fastening operation with pulsed fastening control; and a motor control unit for controlling the electric motor to reduce a fastening-torque reaction force, caused by the screw fastening operation with pulsed fastening control executed by the screw fastening machine, with respect to the holding device.

7 Claims, 9 Drawing Sheets

(56) References Cited

U.S. PATENT DOCUMENTS

2015/0231770 A1* 8/2015 Kusakawa .......... B25B 23/1475
                                                173/93.5
2020/0189048 A1* 6/2020 Klotblixt ............. B25B 23/1475

FOREIGN PATENT DOCUMENTS

| JP | 2007-245284 A | 9/2007 |
| JP | 2010-120094 A | 6/2010 |
| WO | 2017104027 A1 | 6/2017 |

\* cited by examiner

SCREW FASTENING SYSTEM

RELATED APPLICATIONS

The present application is a National Phase of International Application No. PCT/JP2021/046305 filed Dec. 15, 2021, which claims priority to Japanese Application No. 2020-212445, filed Dec. 22, 2020.

FIELD

The present invention relates to a screw fastening system.

BACKGROUND

There has been known a screw fastening system that is equipped with a screw fastening device (nutrunner) at a distal end of an arm of a robot and that is configured to perform a screw fastening operation (e.g., see PTL 1). PTL 2 discloses a configuration example of a screw fastening device.

CITATION LIST

Patent Literature

[PTL 1] WO 2017/104027 A1
[PTL 2] Japanese Unexamined Patent Publication (Kokai) No. H04-310332 A

SUMMARY

Technical Problem

In the screw fastening system, when a reaction force generated in screw fastening is strong, the screw fastening device needs to be retained in a highly rigid apparatus or held by a highly rigid robot, the apparatus or the robot being capable of withstanding a strong reaction force. However, such a highly rigid apparatus or robot tends to be large and heavy in weight, it leads to a problem such as increased equipment cost and constraint on installation sites.

Solution to Problem

One aspect of the present disclosure is a screw fastening system including: an electric motor; a retaining device configured to retain the electric motor; a support member attached to a drive shaft of the electric motor; a screw fastening device supported by the support member, the screw fastening device being capable of performing a screw fastening operation by means of pulse-controlled fastening; and a motor control unit configured to control the electric motor so as to reduce a reaction force against fastening torque (fastening torque reaction force) on the retaining device generated in the screw fastening operation by means of the pulse-controlled fastening performed by the screw fastening device.

Advantageous Effects of Invention

The configuration described above enables a screw fastening operation with high torque without using a highly rigid retaining device and brings advantages such as reduced equipment cost and solution of the constraint on the installation site.

These objects, characteristics, and advantages of the present invention as well as other objects, characteristics, and advantages will become more evident from detailed descriptions of typical embodiments of the present invention illustrated in the accompanying drawings.

DESCRIPTION OF EMBODIMENTS

Figure 1:
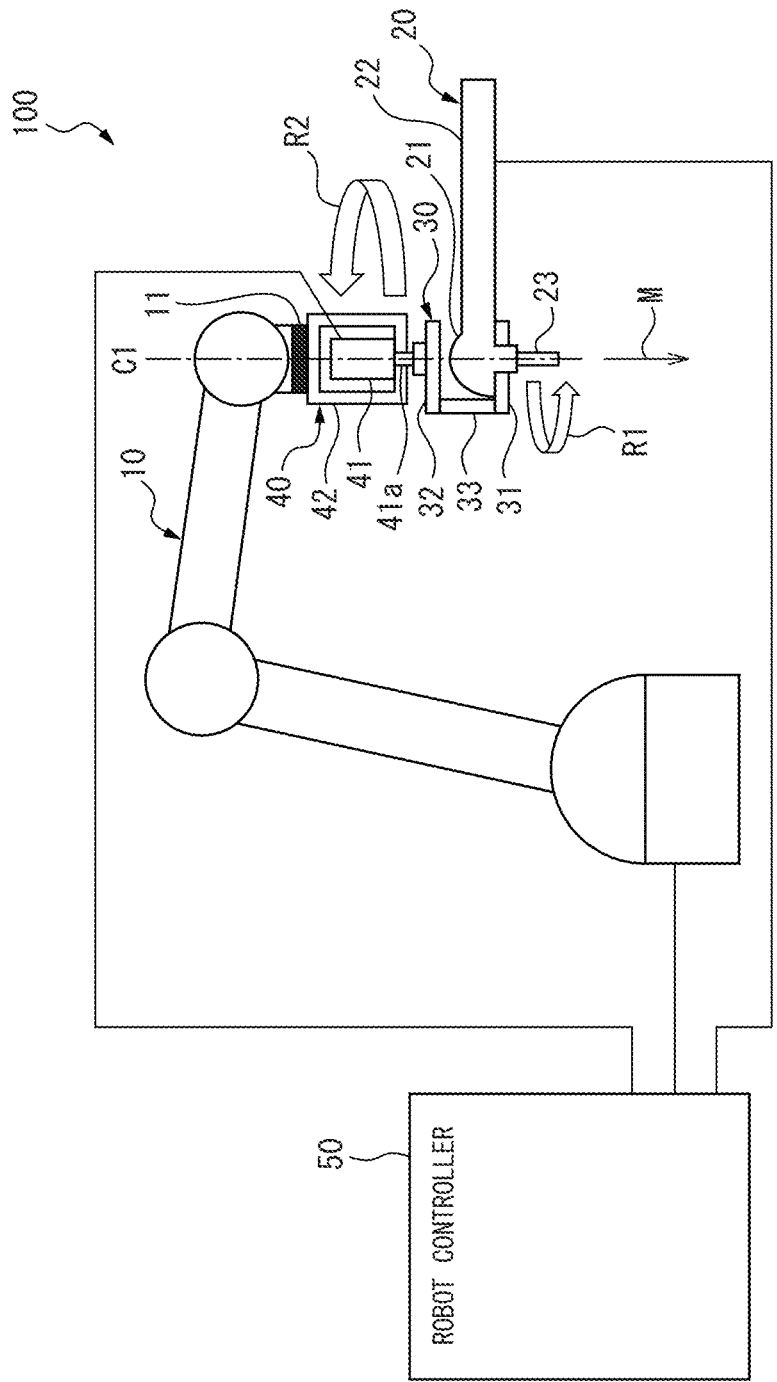
FIG. 1 is a diagram illustrating a configuration of a screw fastening system according to an embodiment.

Next, an embodiment of the present disclosure will be described with reference to the drawings. In the drawings to be referred to, similar components or functional portions are denoted by similar reference signs. To facilitate understanding, these drawings use different scales as appropriate. The embodiment illustrated in the drawings is an example of implementation of the present invention, and the present invention is not limited to the illustrated embodiment.

FIG. 1 is a diagram illustrating a configuration of a screw fastening system 100 according to an embodiment. As illustrated in FIG. 1, the screw fastening system 100 includes: a robot 10 as an industrial machine; a retaining member 40 attached to a wrist flange 11, the wrist flange serving as a movable section of the robot 10; an electric motor 41 retained in the retaining member 40; a support member 30 attached to a drive shaft 41a of the electric motor 41; a screw fastening device 20 supported by the support member 30; and a robot controller 50 for controlling a screw fastening operation of the screw fastening system 100. Although FIG. 1 illustrates an example in which a vertical articulated robot is employed as the robot 10, other types of robots or other types of industrial machines may be employed.

In addition to controlling the robot 10, the robot controller 50 is connected to and controls the electric motor 41 and the screw fastening device 20.

The retaining member 40 has a frame-shaped retaining frame 42 for accommodating and retaining the electric motor 41 in its internal space. The electric motor 41 is fixed at an end face thereof on the side of the drive shaft 41a (in FIG. 1, the bottom side) to a front wall of the retaining frame 42 while the drive shaft 41a passes through a throughhole formed in a central region of the front wall. A back wall of the retaining frame 42 is fixed to a distal end face of the wrist flange 11 of the robot 10. With this configuration, the robot 10 serves as a retaining device for retaining the electric motor 41 (i.e., the retaining member 40), and the electric motor 41 (i.e., the retaining member 40) pivotally supports the screw fastening device 20 (the support member 30).

The screw fastening device 20 is, in one example, an angle screw fastening device (nutrunner), and has a configuration in which an axis of a body 22 that contains a drive source for the screw fastening operation and that is connected to a toolhead 21 for retaining a screw fastening tool is perpendicular to an axis of a tool 23 in the toolhead 21.

The support member 30 for supporting the screw fastening device 20 has, in one example, a C-shaped frame-like shape a in a side view as illustrated in FIG. 1. The support member 30 may have a different shape. The support member 30 includes a bottom wall 31 that fixedly supports the toolhead 21 of the screw fastening device 20, an upper wall 32 that is fixed to the drive shaft 41a of the electric motor 41, and a sidewall 33 that connects the bottom wall 31 with the upper wall 32. The toolhead 21 of the screw fastening device 20 is fixed to the bottom wall 31 in a condition in which a face of the toolhead on the side of the tool is directed downward in the vertical direction in such a way that the toolhead 21 is accommodated in the internal space of the support member 30. The upper surface of the upper wall 32 of the support member 30 is fixed in a central region thereof to the drive shaft 41a of the electric motor 41. In this configuration, when the electric motor 41 (rotating shaft) rotates, the screw fastening device 20 rotates in conjunction with the support member 30.

In FIG. 1, an arrow R1 indicates the direction of a fastening torque reaction force generated by the screw fastening device 20, an arrow M indicates the moving direction (screw traveling direction) of a member (screw member) to be fastened, and an arrow R2 indicates the direction of rotation of the drive shaft 41a of the electric motor 41 caused by the fastening torque reaction force. In the example illustrated in FIG. 1, the screw traveling direction M is directed in the vertical direction. By configuring the screw fastening device 20 to be attached to the wrist flange 11 of the robot 10 in this manner, screw fastening can be performed at a desired position and in a desired orientation.

As will be described in detail below, the robot controller 50 controls the electric motor 41 in such a way that the fastening torque reaction force generated in the screw fastening operation by means of pulse-controlled fastening (to be described later) performed by the screw fastening device 20, i.e., the fastening torque reaction force acting on the robot 10 is reduced.

Figure 2:
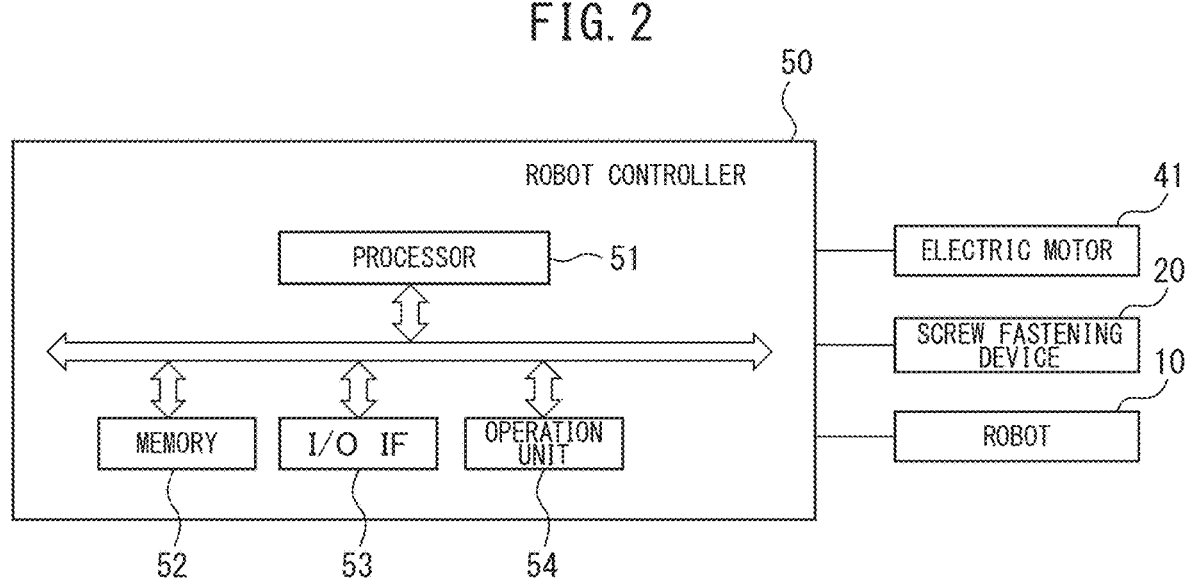
FIG. 2 is a diagram illustrating a schematic hardware configuration of a robot controller.

FIG. 2 is a diagram illustrating a schematic hardware configuration of the robot controller 50. As illustrated in FIG. 2, the robot controller 50 may have a configuration of a general computer, in which a memory (ROM, RAM, a non-volatile memory, or the like) 52, an input/output interface 53, an operation unit 54 including various types of switches, and the like are connected to a processor 51 for performing various types of controls via a bus.

Figure 3:
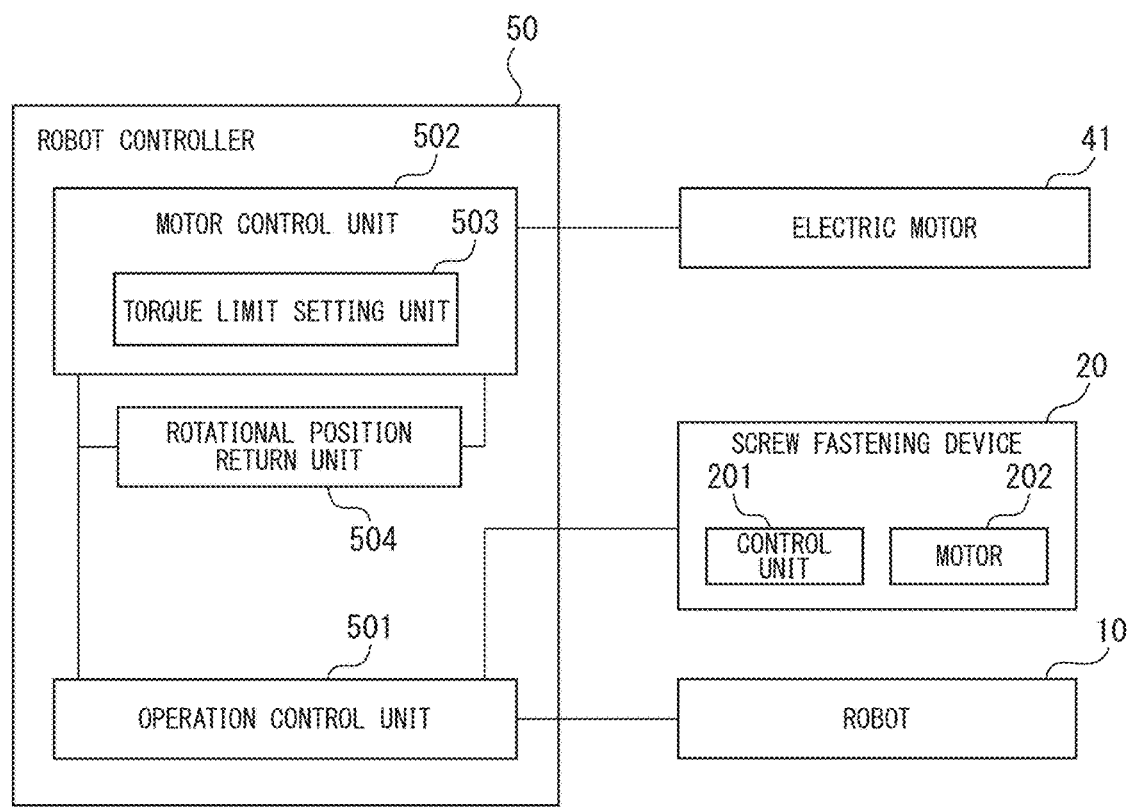
FIG. 3 is a functional block diagram primarily intended to illustrate functions of the robot controller in the screw fastening system.

FIG. 3 is a functional block diagram primarily intended to illustrate functions of the robot controller 50 in the screw fastening system 100. As illustrated in FIG. 3, the robot controller 50 includes an operation control unit 501 for controlling movements of the robot 10 in accordance with an operation program and the like, a motor control unit 502 for controlling the electric motor 41, and a torque limit setting unit 503 for setting a torque limit for the electric motor 41. The operation control unit 501 is further configured to control the screw fastening operation of the screw fastening device 20.

Although the functional block diagram illustrated in FIG. 3 depicts a configuration example in which the motor control unit 502 has a function of servocontrol of the electric motor 41, a configuration is possible in which the electric motor 41 is driven by means of an external motor controller having a motor control function, which is referred to as, as it is called, a "servo amplifier". In this case, the motor control unit 502 in the robot controller 50 serves as a host device for issuing a command (such as a position command) to the external motor controller. The screw fastening device 20 includes a control unit (processor) 201 for receiving and executing a command (for a target torque, an operation mode, starting fastening, and the like) from the operation control unit 501 and a motor 202 that rotates under the control of the control unit 201.

The torque limit setting unit 503 sets the torque limit for the electric motor 41. The torque limit is a constraint for the maximum current of the electric motor 41. Setting a torque limit will prevent the electric motor 41 from generating a torque equal to or greater than the torque limit. In the screw fastening operation, the robot 10 disposes the screw fastening device 20 (i.e., the electric motor 41) at a predetermined rotational position and a rotational position of the electric motor 41 is controlled by means of positioning control to be at a predetermined rotational position, and the screw fastening device 20 is positioned at the predetermined rotational position and kept in this position. Then, the screw fastening device 20 is activated to perform screw fastening. In this screw fastening operation, since the torque limit for the electric motor 41 has been set by the torque limit setting unit 503, the drive shaft 41a of the electric motor 41 (i.e., the screw fastening device 20) will be rotated in a direction of the fastening torque reaction force when the fastening torque reaction force generated in the screw fastening operation performed by the screw fastening device 20 exceeds the torque limit. Thus, it is possible to avoid a strong reaction force from acting on the robot 10 in the screw fastening operation.

Figure 9A:
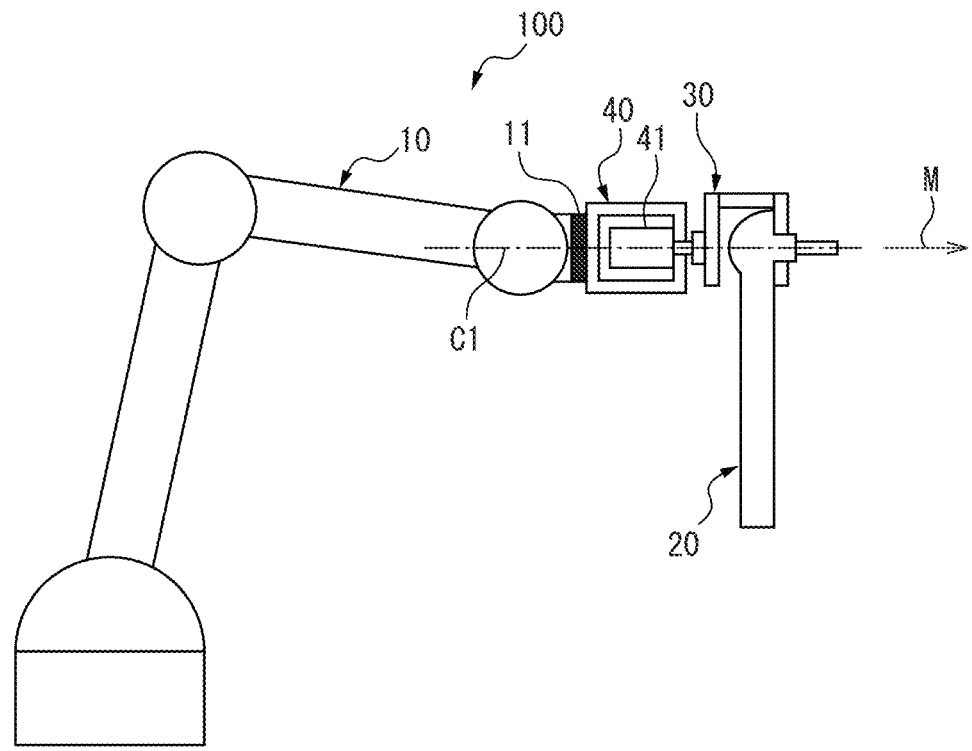
FIG. 9A is a diagram illustrating a first example of a robot in a condition in which a position and an orientation of a wrist flange of the robot is controlled.
Figure 9B:
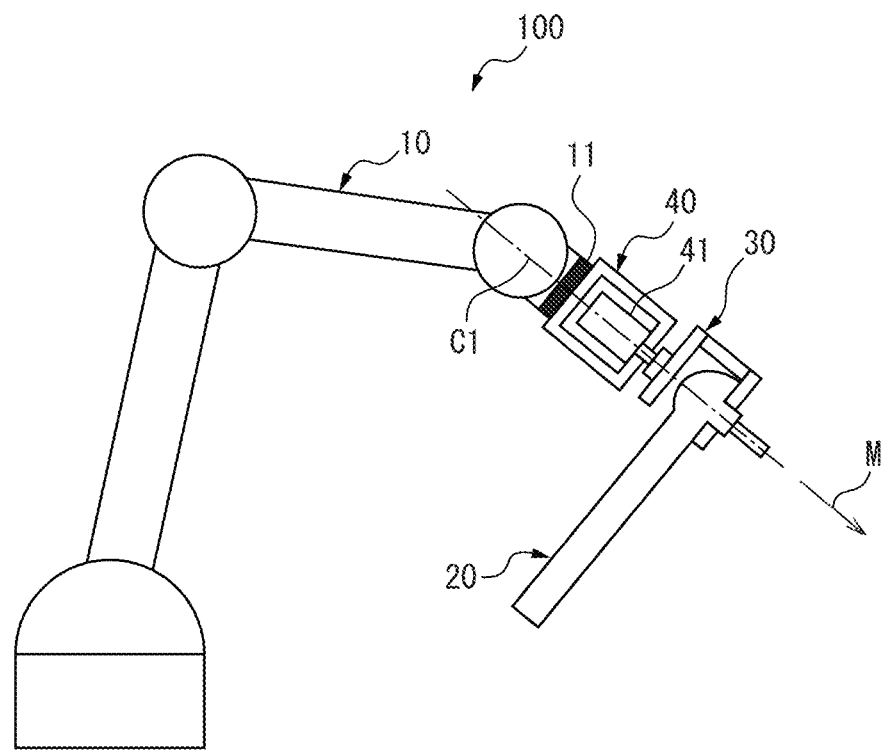
FIG. 9B is a diagram illustrating a second example of the robot in a condition in which the position and the orientation of the wrist flange of the robot is controlled.
Figure 9C:
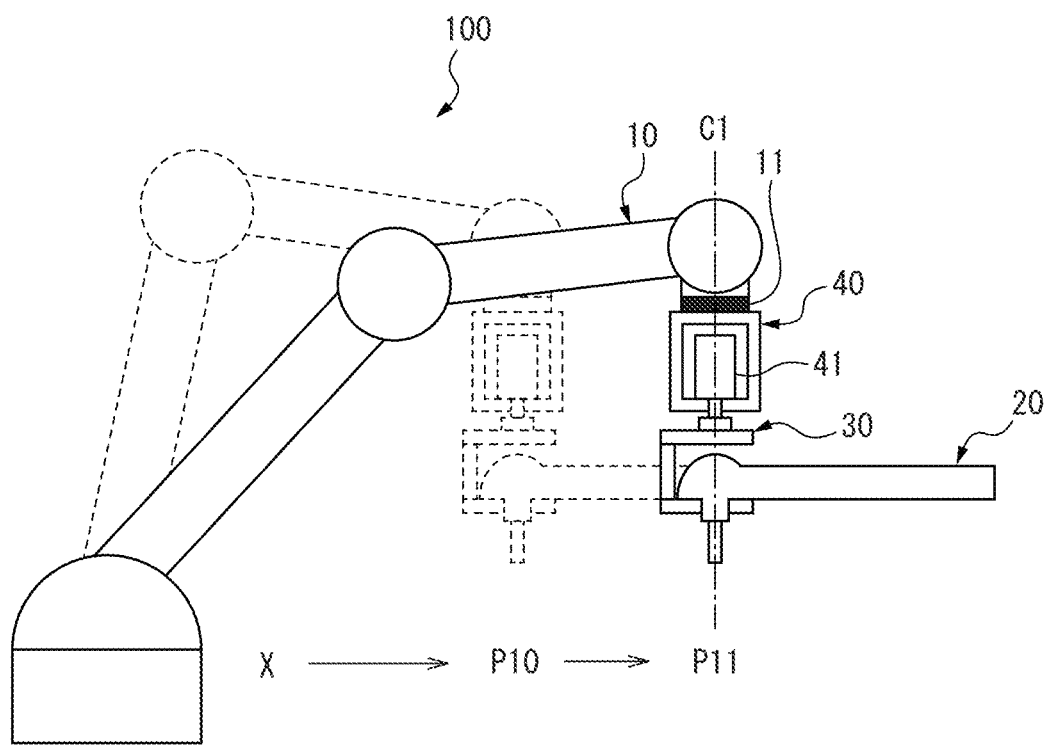
FIG. 9C is a diagram illustrating a third example of the robot in a condition in which the position and the orientation of the wrist flange of the robot is controlled.

The operation control unit 501 determines a trajectory of the robot in accordance with, for example, the operation program, and controls individual servomotors in joint axes of the robot 10 in such a way that a component of the robot 10 such as the wrist flange 11 moves along the determined trajectory. With such a function, the robot controller 50 (the operation control unit 501) can position the screw fastening device 20 (the screw traveling direction M) at a desired position and in a desired orientation. By way of example, FIG. 9A illustrates a condition in which the orientation of the wrist flange 11 is controlled by the operation control unit 501 in such a way that the screw traveling direction M is directed in the horizontal direction (lateral direction). FIG. 9B illustrates a condition in which the orientation of the wrist flange 11 is controlled by the operation control unit 501 in such a way that the screw traveling direction M is directed obliquely downward. FIG. 9C illustrates a condition in which the position of the wrist flange 11 in the X-axis direction (horizontal direction) is controlled by the operation control unit 501 and moved from a position P10 to a position P11. Note that the robot controller 50 is omitted for the sake of convenience in FIG. 9A to FIG. 9C.

The torque limit setting unit 503 sets the torque limit for the electric motor 41. Setting of the torque limit by the torque limit setting unit 503 may be configured in such a way that, for example:
 (A1) a predefined torque limit is automatically applied;
 (A2) a numerical value for a torque limit input in a user operation is accepted; or
 (A3) selection, in a user operation, of a value for the torque limit from a table of recommended values for the torque limit corresponding to the controlling value for the fastening torque, the table possessed by the torque limit setting unit 503 in advance, is accepted.
Note that, when the torque limit is set in a user operation as in (A2) and (A3) described above, an operating device for receiving the user operation (e.g., a teach pendant) may be configured to connect to the robot controller 50.

Figure 4:
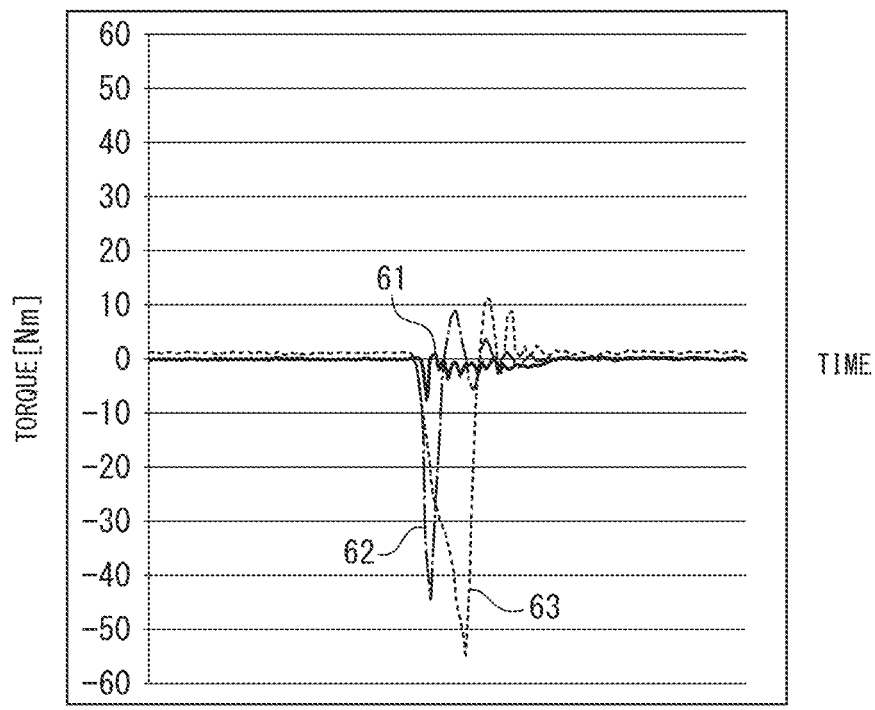
FIG. 4 is a graph for describing an effect of setting a torque limit to reduce a fastening torque reaction force acting on a robot.

FIG. 4 is a graph for describing an effect of setting the torque limit to reduce the fastening torque reaction force acting on the robot. In FIG. 4, the vertical axis indicates the fastening torque reaction force acting on the robot while the horizontal axis indicates time. It is assumed that the value set for a fastening torque (target torque) of the screw fastening device 20 is 50 Nm. It is assumed that the screw fastening device 20 has following operation modes for controlling the torque during screw fastening: normal fastening control in which, for example, torque is continuously applied; and pulse-controlled fastening in which torque is applied in a pulsed manner. In the pulse-controlled fastening, the motor in the screw fastening device is supplied with a current that is pulsed and increased incrementally, which enables the motor in the screw fastening device to generate a torque that is pulsed and increased incrementally. The pulse-controlled fastening has an advantage that the fastening torque reaction force may be reduced in comparison to the normal fastening control in which torque is continuously applied. In the final phase of the screw fastening operation, the fastening torque reaction force is particularly increased, and the effect of the pulse-controlled fastening to reduce the fastening torque reaction force becomes greater. In a typical example of the normal fastening control, control is performed to incrementally increase the fastening torque after the start of the operation until reaching the target torque. In the pulse-controlled fastening, control is performed after the start of the operation to generate torque intermittently (e.g., periodically) in a pulsed manner and to incrementally increase peak values of successive pulses until reaching the target torque. As used herein, the pulse-controlled fastening includes any control method in which the fastening torque reaction force may be reduced in comparison to the normal fastening control by generating torque in a pulsed manner or generating torque for an instant (as one pulse).

In FIG. 4, the dashed line 63 in the graph indicates the fastening torque reaction force acting on the robot 10 when the screw fastening device 20 is operated in the normal fastening control in a configuration in which the screw fastening device 20 is directly attached to the robot 10 without using the electric motor 41. In this case, a fastening torque reaction force of 55 Nm in magnitude is generated. In FIG. 4, the long dashed short dashed line 62 in the graph indicates the fastening torque reaction force acting on the robot 10 when the screw fastening device 20 is operated in the pulse-controlled fastening in a configuration in which the screw fastening device is directly attached to the robot 10 without using the electric motor 41. In this case, the magnitude of the fastening torque reaction force is 43 Nm.

In FIG. 4, the solid line 61 in the graph indicates the fastening torque reaction force acting on the robot when the screw fastening device is operated in the pulse-controlled fastening in the configuration of the present embodiment (i.e., the configuration using the electric motor 41). In this case, the torque limit for the electric motor 41 being set to an appropriate value, the magnitude of the fastening torque reaction force acting on the robot is 8 Nm. In the graph in FIG. 4, the sign of the fastening torque reaction force is negative. In the present embodiment, it is understood that the fastening torque reaction force acting on the robot 10 (line 61) may be significantly reduced in comparison to the lines 62 and 63 by setting a torque limit for the electric motor 41.

The torque limit is set to a value that restricts the maximum current for the electric motor 41. The fastening torque reaction force can be measured by disposing a force sensor between the robot 10 and a device for reducing the fastening torque reaction force (composed of the retaining member 40, the electric motor 41, the support member 30, and the screw fastening device 20).

The robot controller 50 (the motor control unit 502) may possess a numerical table in which the torque limit and the fastening torque reaction force (measured value) are associated with each other in the memory (non-volatile memory) 52. The robot controller 50 may also be configured to display such a numerical table on a display device (e.g., a display panel of the robot controller 50 or a display unit of a teach pendant connected to the robot controller 50) and accept the torque limit selected by the user. In this case, the robot controller 50 may highlight one or more recommended values for the torque limit and prompts the user to select one of the recommended values. The recommended values for the torque limit are selected in such a way that, for example, the fastening torque reaction force is sufficiently lower than an allowable torque of the retaining device.

Figure 5:
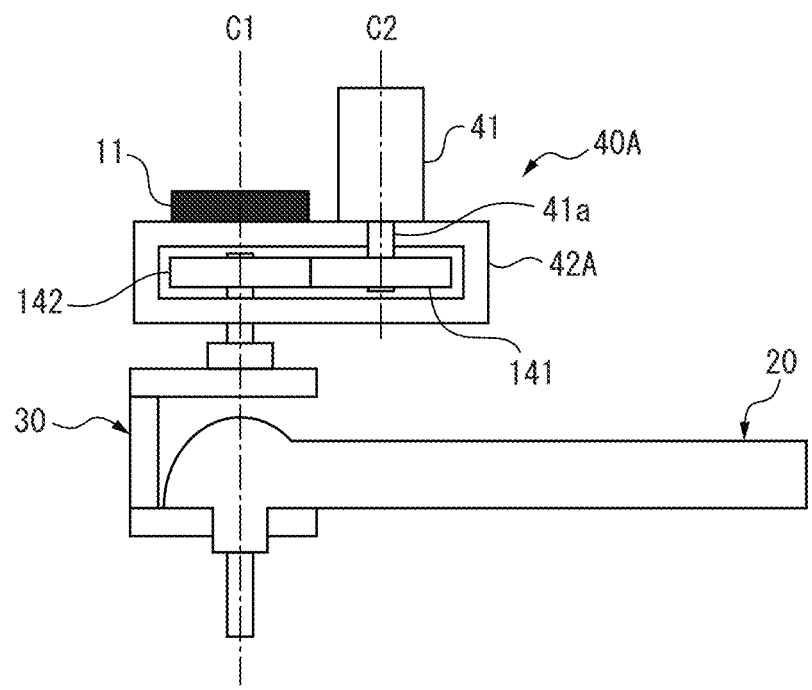
FIG. 5 is a diagram illustrating a first alternative example of an electric motor.
Figure 6:
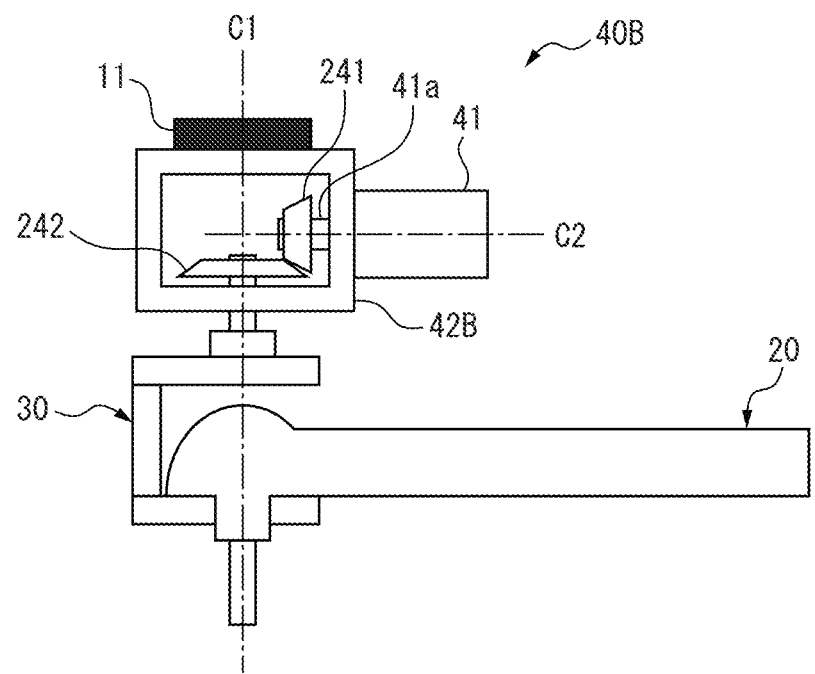
FIG. 6 is a diagram illustrating a second alternative example of the electric motor.

FIG. 5 and FIG. 6 are diagrams illustrating alternative examples of the retaining member 40 and the electric motor 41. As illustrated in FIG. 5 and FIG. 6, a gearing system may be attached to the electric motor 41. In a configuration as illustrated in FIG. 5, a retaining member 40A that retains the electric motor 41 includes a retaining frame 42A. In the internal space of the retaining frame 42A, a gearing system composed of spur gears 141 and 142 is disposed. The retaining frame 42A is a frame having a rectangular shape in a side view illustrated in FIG. 5 and accommodates the spur gears 141 and 142 in its internal space. In FIG. 5, for the sake of convenience, only the wrist flange 11 is illustrated as a mechanism of the robot 10. In the mechanism illustrated in FIG. 5, the gearing system is disposed in such a way that an axis of the spur gear 142 of the spur gears 141 and 142 that compose the gearing system, the spur gear 142 being located on the output side, coincides with the centerline C1 of the wrist flange 11 of the robot 10. The electric motor 41 is mounted on an upper surface of an upper wall of the retaining frame 42A in such a way that the drive shaft 41a is directed downward and the central axis C2 of the drive shaft 41a is parallel to the centerline C1. In the configuration as illustrated in FIG. 5, the electric motor 41 may be disposed outside of the retaining frame 42A, thereby enabling the retaining frame 42A to be thinner.

In a configuration as illustrated in FIG. 6, a retaining member 40B that retains the electric motor 41 includes a retaining frame 42B. In the internal space of the retaining frame 42B, a gearing system composed of bevel gears 241 and 242 is disposed. The retaining frame 42B is a frame having a rectangular shape in a side view illustrated in FIG. 6 and accommodates the bevel gears 241 and 242 in its internal space. In FIG. 6, for the sake of convenience, only the wrist flange 11 is illustrated as a mechanism of the robot 10. In the mechanism illustrated in FIG. 6, the gearing system is disposed in such a way that an axis of the bevel gear 242 of the bevel gears 241 and 242 that compose the gearing system, the bevel gear 242 being located on the output side, coincides with the centerline C1 of the wrist flange 11 of the robot 10. The electric motor 41 is mounted on an outer side surface of a sidewall of the retaining frame 42B in such a way that the central axis C2 of the drive shaft 41a is perpendicular to the centerline C1.

With the configurations as illustrated in FIG. 5 and FIG. 6, the magnitude (effective value) of the fastening torque reaction force (external force) that is exerted back on the electric motor 41 may be regulated based on a gear ratio.

Figure 7:
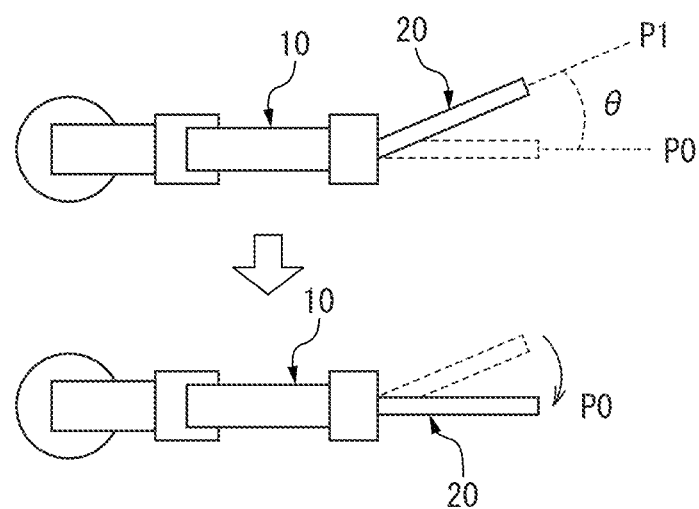
FIG. 7 is a diagram for describing an operation of returning a rotational position of a screw fastening device rotated in a screw fastening operation.

As described above, when the fastening torque reaction force generated in the screw fastening operation exceeds the torque limit for the electric motor 41, the electric motor 41 (the screw fastening device 20) will rotate during the screw fastening operation or after completion of the screw fastening operation in a direction in which the fastening torque reaction force is applied to the electric motor 41. The upper diagram of FIG. 7 illustrates a condition in which the screw fastening device 20 is rotated by the fastening torque reaction force generated in the screw fastening operation by an angle θ from an initial position P0 to a position P1 in a direction in which the fastening torque reaction force is applied to the screw fastening device 20. The upper and lower diagrams of FIG. 7 are diagrams of the robot 10 viewed from above.

As illustrated in FIG. 3, the robot controller 50 may further include a rotational position return unit 504. The rotational position return unit 504 acquires the rotational position of the screw fastening device 20 that has been rotated in the screw fastening operation in conjunction with the support member 30 from an output of an encoder of the electric motor 41, and rotates the electric motor 41 in such a way that the screw fastening device 20 (the support member 30) is returned to the initial position or a preset position. The lower diagram of FIG. 7 illustrates a condition in which the rotational position return unit 504 returns the screw fastening device 20, which has been rotated by the angle θ, to the initial position P0.

As describe above, the present embodiment enables the screw fastening operation with high torque without using a highly rigid retaining device and brings advantage such as reduced equipment cost and solution of the constraint on the installation site.

Although the present invention has been described above using a typical embodiment, those skilled in the art will be able to understand that a variety of other modifications, omissions, or additions may be made to the individual embodiments described above without departing from the scope of the present invention.

Figure 8:
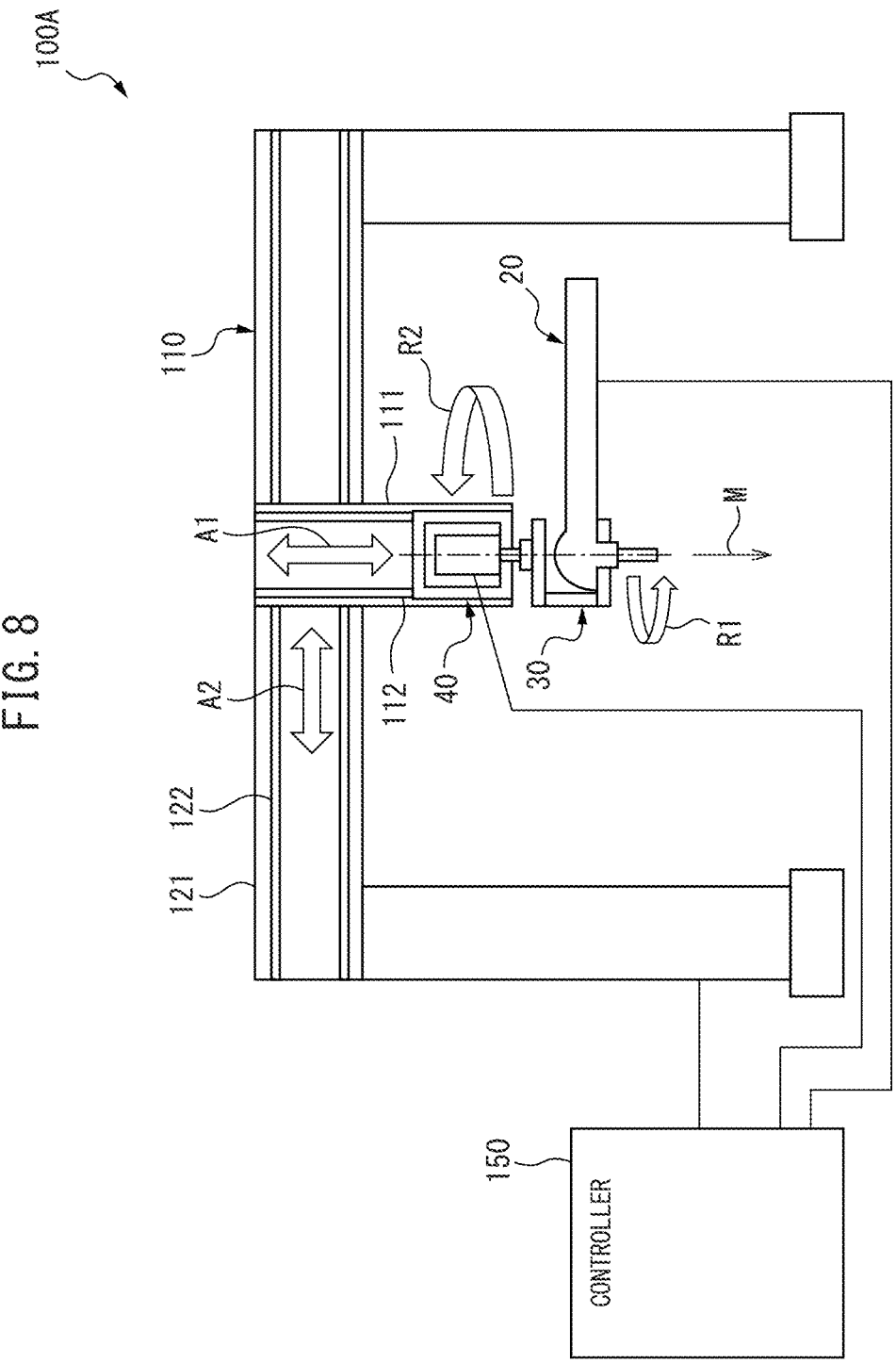
FIG. 8 is a diagram illustrating another configuration of the screw fastening system.

Although the embodiment described above has been described using an example in which an industrial robot is used as the retaining device for retaining the electric motor, various industrial machines having a movable section may be used as the retaining device for retaining the electric motor. FIG. 8 illustrates a configuration example of a screw fastening system 100A including a retaining device 110 that includes an elevator mechanism 111 for moving a spindle/toolhead unit equipped with a retaining member 40 (for retaining the electric motor 41) up and down and a horizontal transfer mechanism 121 for moving the spindle/toolhead unit horizontally. In FIG. 8, the same reference signs denote comparable components as those in FIG. 1, and corresponding descriptions will be omitted.

In the retaining device 110 illustrated in FIG. 8, the spindle/toolhead unit can move along a rail 112 in a vertical direction (the direction of an arrow A1) in the elevator mechanism 111 while the elevator mechanism 111 can move along a rail 122 in a horizontal direction (the direction of an arrow A2) in the horizontal transfer mechanism 121. The controller 150 has a configuration similar to that of the robot controller 50 illustrated in FIG. 2 and FIG. 3, and controls movement of the retaining device 110, movement of the electric motor 41, and movement of the screw fastening device 20. In this case, the controller 150 may be configured using a PLC (Programmable Logic Controller).

Figure 10:
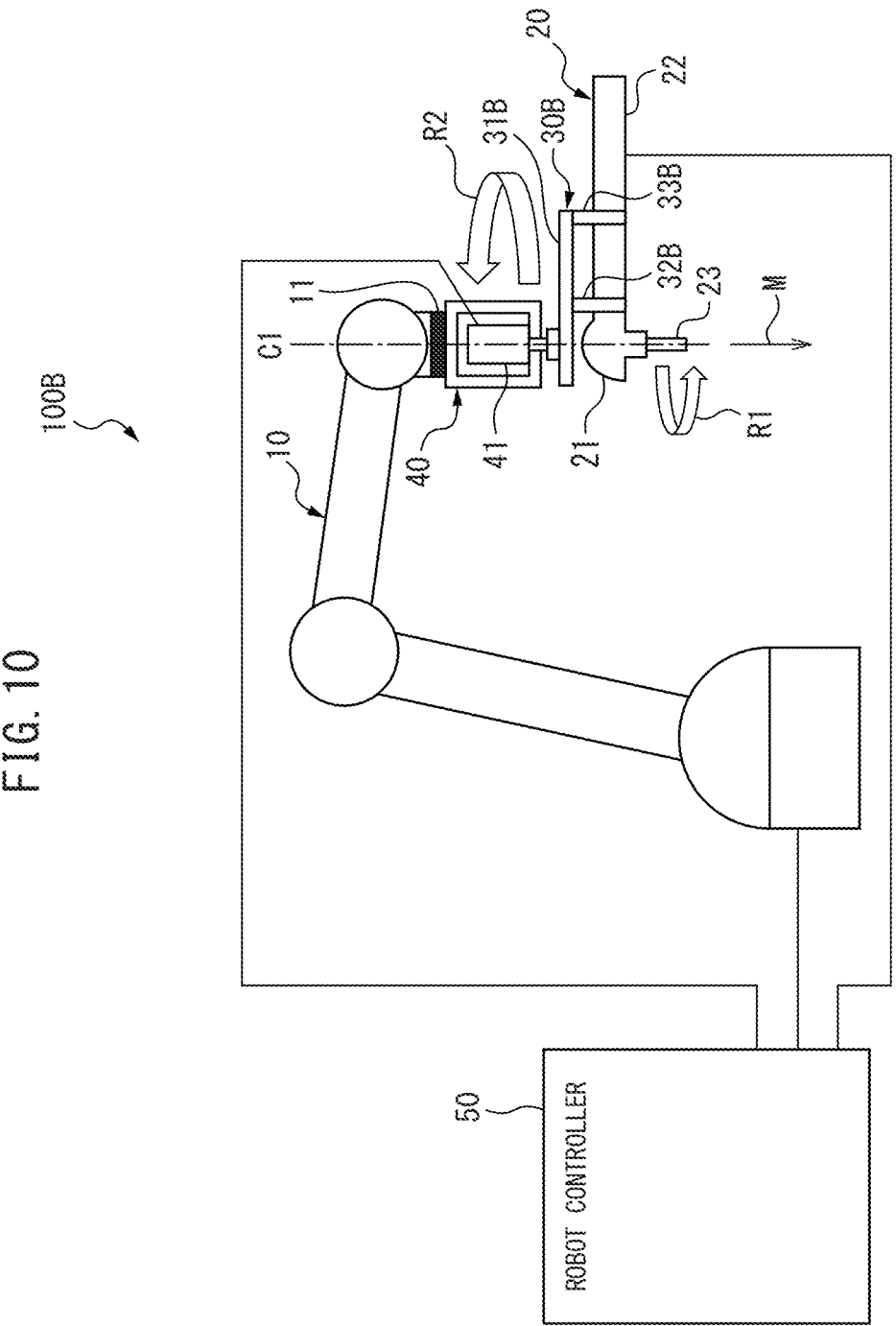
FIG. 10 is a configuration diagram of the screw fastening system employing an alternative exemplary support member for the screw fastening device.

The shape of the support member 30 in the embodiment described above is one example and the support member for supporting the screw fastening device 20 may be differently shaped. FIG. 10 illustrates a configuration of a screw fastening system 100B employing a support member 30B as a support member for supporting the screw fastening device 20. In FIG. 10, the same reference signs denote the same components as those in FIG. 1, and corresponding descriptions will be omitted. The support member 30B includes a main support plate 31B that is fixed at one end portion thereof to the drive shaft of the electric motor 41 and that is disposed so as to extend in a horizontal direction in the condition illustrated in FIG. 10 and mounting frames 32B and 33B respectively connected to the central region and the other end portion of the main support plate 31B. The mounting frames 32B and 33B fixedly support the screw fastening device With such a configuration, the same function as provided in the embodiment illustrated in FIG. 1 is also achieved.

Figure 11:
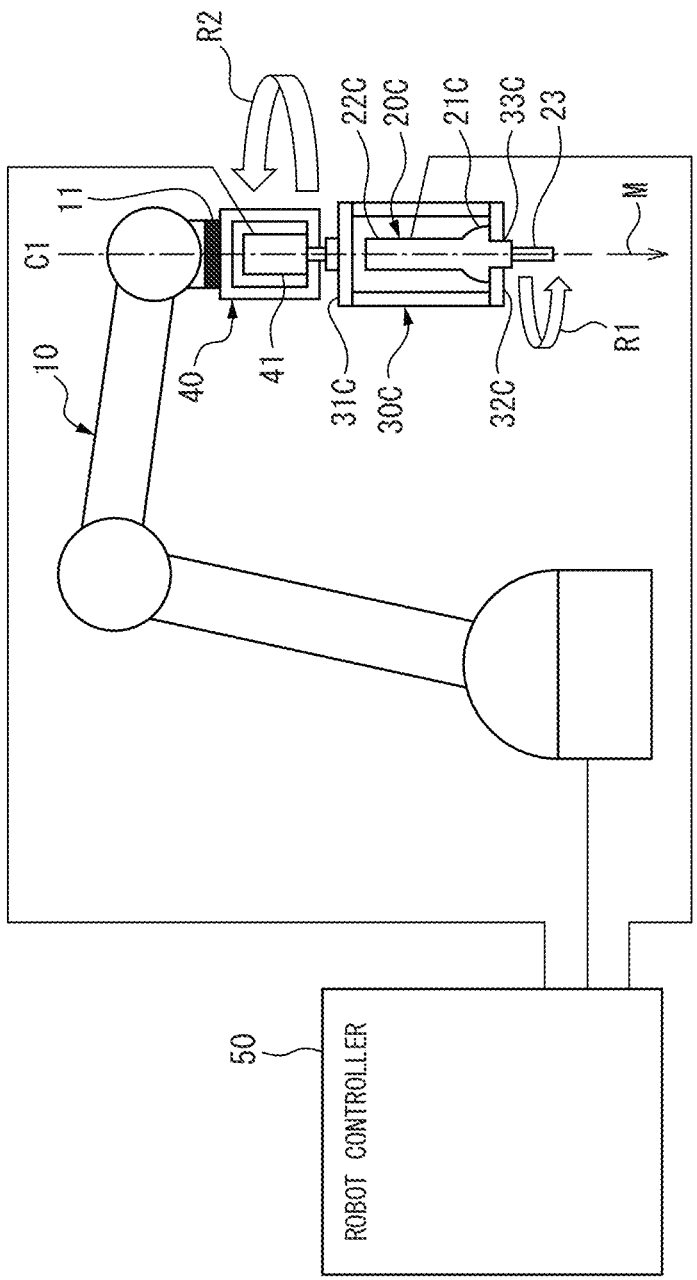
FIG. 11 is a configuration diagram of the screw fastening system employing an in-line screw fastening device.

Although in the embodiments described above, configuration examples have been described in which an angle screw fastening device 20 is employed as the screw fastening device, an in-line screw fastening device may be used as the screw fastening device. FIG. 11 illustrates a configuration example of a screw fastening system 100C employing an in-line screw fastening device 20C. In FIG. 11, the same reference signs denote the same components as those in FIG. 1, and corresponding descriptions will be omitted. In the screw fastening device 20C, an axis of a body 22C that contains a drive source that is connected to a toolhead 21C for retaining the tool 23 coincides with an axis of the tool 23 in the toolhead 21C. The screw fastening device 20C is supported by the support member 30C. The support member 30C has a rectangular frame-like shape in a side view (sectional view) illustrated in FIG. 11 and retains the screw fastening device 20C in its internal space. More specifically, the screw fastening device 20C is fixed in a condition in which a projecting distal end of the toolhead 21C is fit into a throughhole 33C formed in a lower wall 32C of the support member 30C. An upper wall 31C of the support member 30C is fixed to the drive shaft of the electric motor 41. It is assumed that the screw fastening device 20C has the same function (pulse-controlled fastening or the like) as the screw fastening device 20. With the configuration described above, the same function provided when employing the screw fastening device 20 (i.e., the function to avoid a strong reaction force acting on the robot 10 in the screw fastening operation in the pulse-controlled fastening) is achieved. Note that, when employing the in-line screw fastening device 20C, rotation of the screw fastening device 20C need not be considered and the function of the rotational position return unit 504 in the embodiment described above may be omitted.

Although the embodiments described above have a construction in which the electric motor 41 is fixed to the wrist flange 11 of the robot 10 via the retaining member 40, various constructions may be employed for fixing the electric motor 41 to the wrist flange 11.

The screw fastening operation according to the embodiments above may be performed on various workpieces such as a workpiece fixed to a fixture, a workpiece transferred by a conveyor, or a workpiece grasped by a robot (a robot different from the robot 10), and applied to various workpiece supply methods.

The functional blocks of the robot controller 50 illustrated in FIG. 3 may be implemented by executing various types of software stored in a storage device by the processor 51 of the robot controller 50, or may be implemented using a configuration consisting mainly of hardware devices such as an ASIC (Application Specific Integrated Circuit).

REFERENCE SIGNS LIST

10 Robot
20C Screw fastening device
30, 30B, 30C Support member
40A, 40B Retaining member
41 Electric motor
41a Drive shaft
42 Retaining frame
50 Robot controller
51 Processor
52 Memory
53 Input/output interface
54 Operation unit
100, 100A, 100B, 100C Screw fastening system
150 Controller
201 Control unit
202 Motor
501 Operation control unit
502 Motor control unit
503 Torque limit setting unit
504 Rotational position return unit

The invention claimed is:

1. A screw fastening system, comprising:
an electric motor;
a machine configured to retain the electric motor;
a support frame attached to a drive shaft of the electric motor;
a nutrunner supported by the support frame, the nutrunner being capable of performing a screw fastening operation by means of pulse-controlled fastening; and
a processor configured to control the electric motor so as to reduce a fastening torque reaction force on the machine generated in the screw fastening operation by means of the pulse-controlled fastening performed by the nutrunner.

2. The screw fastening system according to claim 1, wherein
the processor is configured to
set a torque limit for the electric motor, and
in response to a load torque due to the fastening torque reaction force exceeding the set torque limit, control the electric motor to cause the fastening torque reaction force on the machine to reduce with the drive shaft being rotated in a direction of the fastening torque reaction force.

3. The screw fastening system according to claim 2, wherein
the processor is configured to accept a user operation for inputting a numerical value to set the torque limit.

4. The screw fastening system according to claim 2, wherein
the processor is configured to accept a user operation for selecting the torque limit from a numerical table representing recommended values for the torque limit.

5. The screw fastening system according to claim 1, wherein
the processor is configured to
acquire a rotational position of the nutrunner that has been rotated in the screw fastening operation in conjunction with the support frame from an output of an encoder of the electric motor, and
rotate the electric motor in such a way that the support frame and the nutrunner are returned to an initial position or a preset position.

6. The screw fastening system according to claim 1, wherein
the machine is a robot,
the nutrunner device is attached to a wrist of the robot via the electric motor and the support frame, and
the screw fastening system further comprising a robot controller configured to control a position and an orientation of the wrist of the robot.

7. The screw fastening system according to claim 6, wherein
the robot controller is configured to control the position and the orientation of the wrist in such a way that a screw traveling direction of the nutrunner is directed in a desired direction.

* * * * *